United States Patent [19]
Lo et al.

[11] Patent Number: 5,684,591
[45] Date of Patent: Nov. 4, 1997

[54] FIBER OPTIC GYROSCOPE WITH REDUCED NON-LINEARITY AT LOW ANGULAR RATES

[75] Inventors: Pei-hwa Lo, Ramsey; Robert A. Kovacs, West Orange, both of N.J.

[73] Assignee: Alliedsignal Inc., Morristown, N.J.

[21] Appl. No.: 652,892

[22] Filed: May 23, 1996

[51] Int. Cl.$^6$ .................................................. G01C 19/64
[52] U.S. Cl. .................................................. 356/350
[58] Field of Search .................................................. 356/350

[56] References Cited

U.S. PATENT DOCUMENTS 5,504,580  4/1996  Hollinger et al. ........................ 356/350

Primary Examiner—Vincent P. McGraw
Attorney, Agent, or Firm—Verne E. Kreger, Jr.

[57] ABSTRACT

The linearity of a fiber optic gyroscope can be improved by dithering the gyroscope's feedback signal. Any undesirable effects introduced by the dithering signal are removed by processing the gyroscope data over an entire cycle of the dithering signal. A further improvement in linearity can be achieved by introducing a compensation signal.

15 Claims, 4 Drawing Sheets

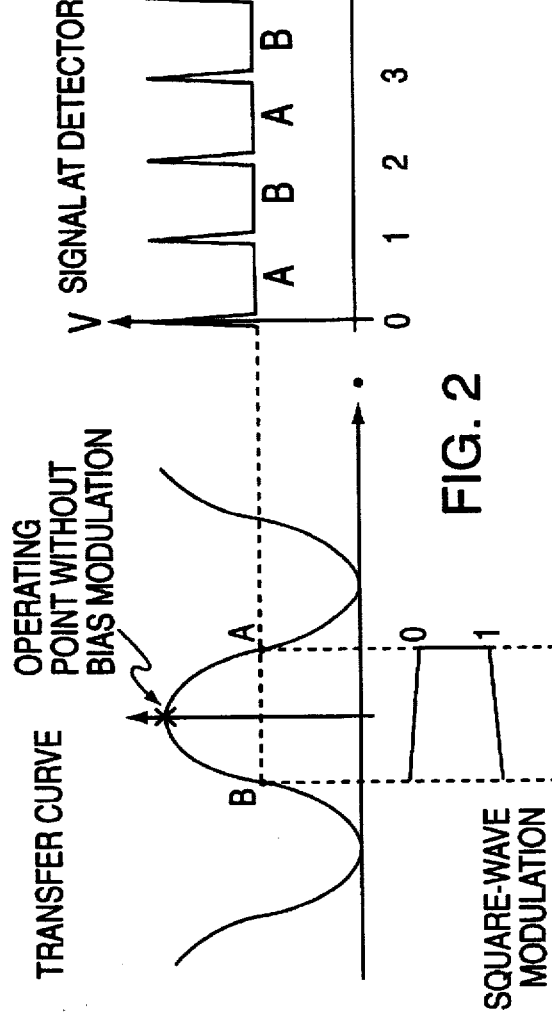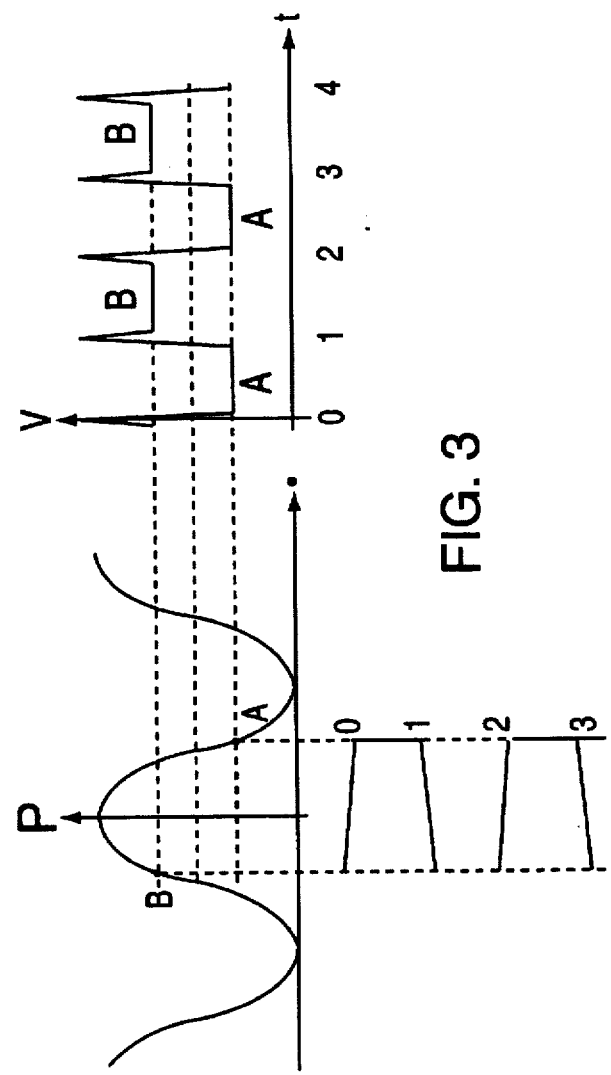

FIBER OPTIC GYROSCOPE WITH REDUCED NON-LINEARITY AT LOW ANGULAR RATES

BACKGROUND OF THE INVENTION

This invention relates generally to fiber optic gyroscopes. More particularly, it relates to a scheme for overcoming errors that occur at low angular rates.

At low angular rates, the optics and electronics of an interferometric fiber optic gyroscope may be insensitive to angular motion, resulting in a deadzone. Instead of a linear response to an input angular rate, the transfer curve may exhibit a flat zone until some undefined threshold is exceeded.

It would therefore be highly desirable to produce a gyroscope that exhibits a linear response to any applied angular rate.

BRIEF DESCRIPTION OF DRAWINGS

A more complete understanding of the present invention, as well as other objects and advantages thereof not enumerated herein, will become apparent upon consideration of the following detailed description and the accompanying drawings, wherein:

FIG. 2 is a waveform diagram of the transfer curve for the gyroscope of FIG. 1 with no input angular rate;

FIG. 3 is a waveform diagram of the transfer curve for the gyroscope of FIG. 1 with an input angular rate;

BEST MODE FOR CARRYING OUT THE INVENTION

Figure 1:
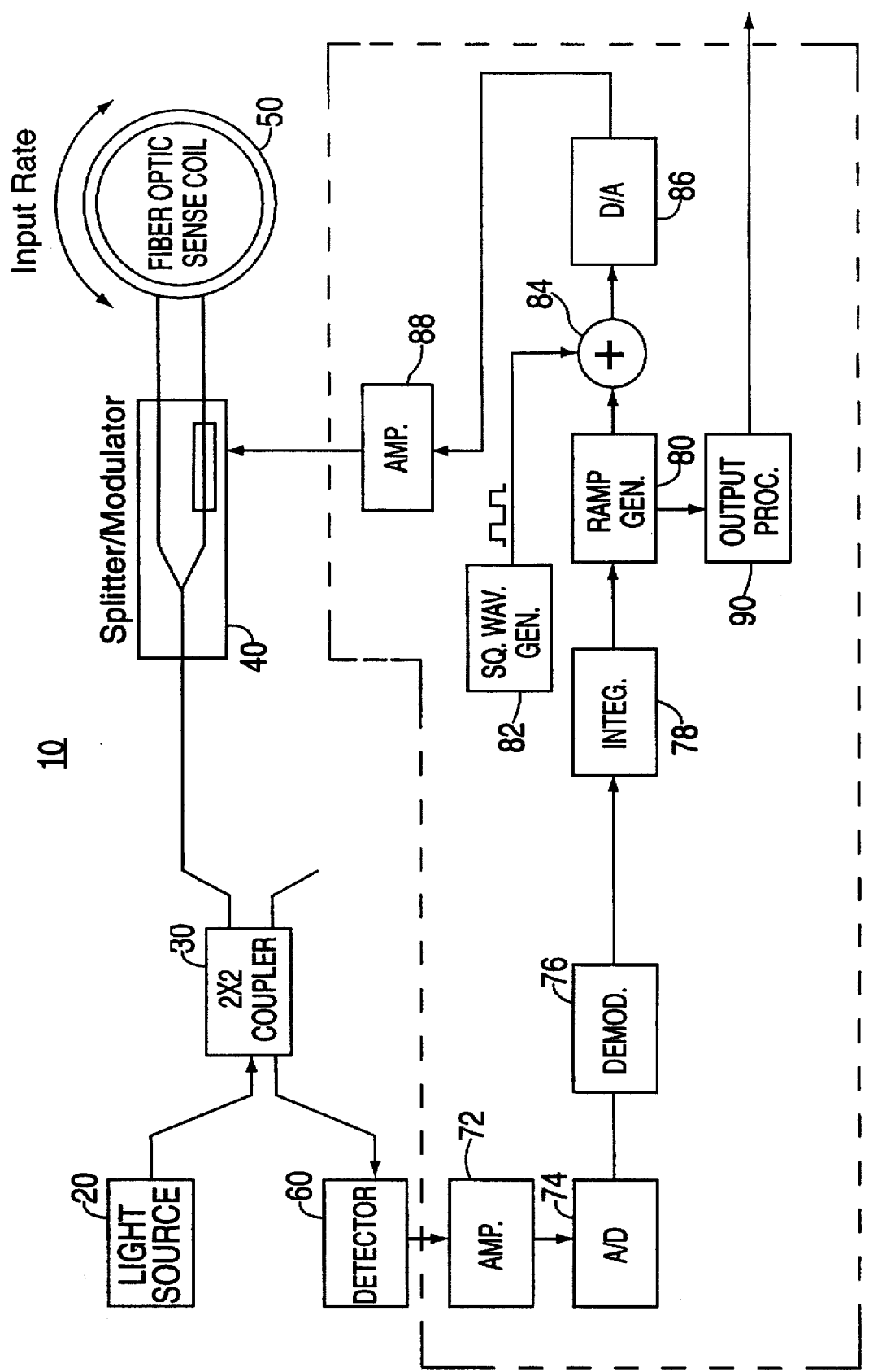
FIG. 1 is a schematic block diagram of a closed-loop interferometric fiber optic gyroscope.

A closed-loop interferometric fiber optic gyroscope 10 is shown in FIG. 1. Gyroscopes of this type are discussed at length in U.S. Pat. No. 5,278,631, issued Jan. 11, 1994, to Hollinger et al., for a Closed Loop Fiber Optic Gyroscope with Signal Processing Arrangement for Improved Performance; U.S. Pat. No. 5,280,339 issued Jan. 18, 1994, to Hollinger et al., for a Closed Loop Fiber Optic Gyroscope with Fine Angle Resolution; U.S. Pat. No. 5,309,220, issued May 3, 1994, to Hollinger et al., for a Closed Loop Fiber Optic Gyroscope with Reduced Sensitivity to Electronic Drift; and U.S. Pat. No. 5,504,580 issued Apr. 2, 1996, to Hollinger et al., for a Tuned Integrated Optic Modulator on a Fiber Optic Gyroscope; all of which are incorporated herein by reference.

As shown in FIG. 1, the gyroscope 10 has the following components: a light source 20, a bidirectional coupler 30, a splitter/modulator 40, a fiber optic sense coil 50, a detector 60, and a signal processor 70. The signal processor 70 has a preamplifier 72, an analog-to-digital (A/D) converter 74, a synchronous demodulator 76, a summer or an integrator 78, a ramp generator 80, a square-wave generator 82, a summing means 84, a digital-to-analog (D/A) converter 86, a modulation signal amplifier 88, and an output processor 90, as further illustrated in the figure.

Light from the light source 20 passes through the bidirectional coupler 30 to the splitter/modulator 40, where it is split into two beams which enter the fiber optic sense coil 50—one travels in a clockwise direction, the other in a counterclockwise direction. The two beams then recombine and travel back through the splitter/modulator 40 and the bidirectional coupler 30 to the detector 60.

The output of the detector 60 enters the signal processor 70, first being amplified by the preamplifier 72 and then converted to a digital format by the A/D converter 74. The output of the A/D converter 74 is demodulated by the demodulator 76 and then integrated by the integrator 78. The demodulator 76 may be implemented as a square-wave detector.

The output of the integrator 78 drives the ramp generator 80, which generates a signal to drive the loop feedback signal to zero. By definition, the slope of the output curve of the ramp generator 80 will be proportional to the input angular rate for the gyroscope 10.

The output of the detector 60 can be represented by the transfer curve illustrated in FIG. 2. When the input angular rate is zero, the output rests at a steady-state operating point, shown as point X in FIG. 2. When an input angular rate is applied, the operating point shifts in one direction or the other. However, since the slope of the transfer curve is relatively flat at the steady-state operating point, the sensitivity is low and the direction of movement cannot be determined.

To improve sensitivity and provide a means for detecting the direction of change of angular rate, the output of the ramp generator 80 is modulated with a square-wave bias signal from the square-wave generator 82 at the summing means 84. By modulating the output of the ramp generator 80 with a square wave, the operating point of the gyroscope 10 is shifted from the peak of the transfer function curve (to points A and B) and then oscillates between those two points. A suitable frequency for the square-wave signal is 30 kHz, but the specific value is dependant on the physical parameters of the gyroscope as determined from:

$$f=1/2\tau \text{ and } \tau=nL/c$$

where $f$=modulation frequency;

$\tau$=transit time through the sense coil;

$n$=index of refraction of the sense coil;

$L$=length of the sense coil; and $c$=the speed of light.

The output of the summing means 84 drives the D/A converter 86 and the analog output of the converter 86 drives the modulation signal amplifier 88, which in turn is connected to the splitter/modulator 40. The output of the ramp generator 80 is also provided to the output processor 90 which in turn develops a signal that indicates the applied angular rate (the informational output of the gyroscope 10).

If no angular rate is applied to the sense coil 50, the two beams will be in-phase and cumulative. The square-wave bias signal shifts the operating point to points A and B as shown in FIG. 2 and therefore the output of the detector 60 will be the same during both halves of the square wave. The output of the square-wave generator 82 will force the input to the D/A converter 86 to swing between points A and B, as shown in FIG. 2.

If the angular rate remains at zero, the output of the demodulator 76 will be zero. Consequently, the output of the integrator 78 will remain at zero and the output of the ramp generator 80 will remain constant. The output of the summing means 84 is then converted to an analog signal and applied to the splitter/modulator 40 after amplification (amplifier 88). Alternatively, by placing the D/A converter 86 ahead of the summing means 84, the output of the ramp generator 80 could be converted to an analog signal and then the square wave could be applied in the analog domain.

The square-wave modulation does not affect the output of the gyroscope 10. The output processor 90 performs rate calculations over an integral number of modulation cycles thereby removing any influence of the square wave. The computed rate is determined from the incremental change in the output of the ramp generator 80 from one output cycle to the next. A suitable frequency range for the output cycle is 100 Hz to 1,000 Hz.

When an angular rate is applied to the sense coil 50, the two beams will not be in phase as they recombine, and therefore one will subtract from the other, causing a shift of the operating points A and B on the transfer curve (FIG. 3) which is detected by detector 60. Since the demodulator 76 will sense a change in the detected signal over time, its output will no longer be zero and therefore the integrator 78 will produce a non-zero output, proportional to the phase difference between the clockwise and the counterclockwise beams, exciting the ramp generator 80. In turn, a signal modulated by the square-wave generator 82 ultimately will be provided to the splitter/modulator 40, driving the detected loop signal back to a zero value and rebalancing the system in response to the applied angular rate. As a result of the rebalancing, points A and B return to the respective positions shown in the waveform of FIG. 2.

Figure 4:
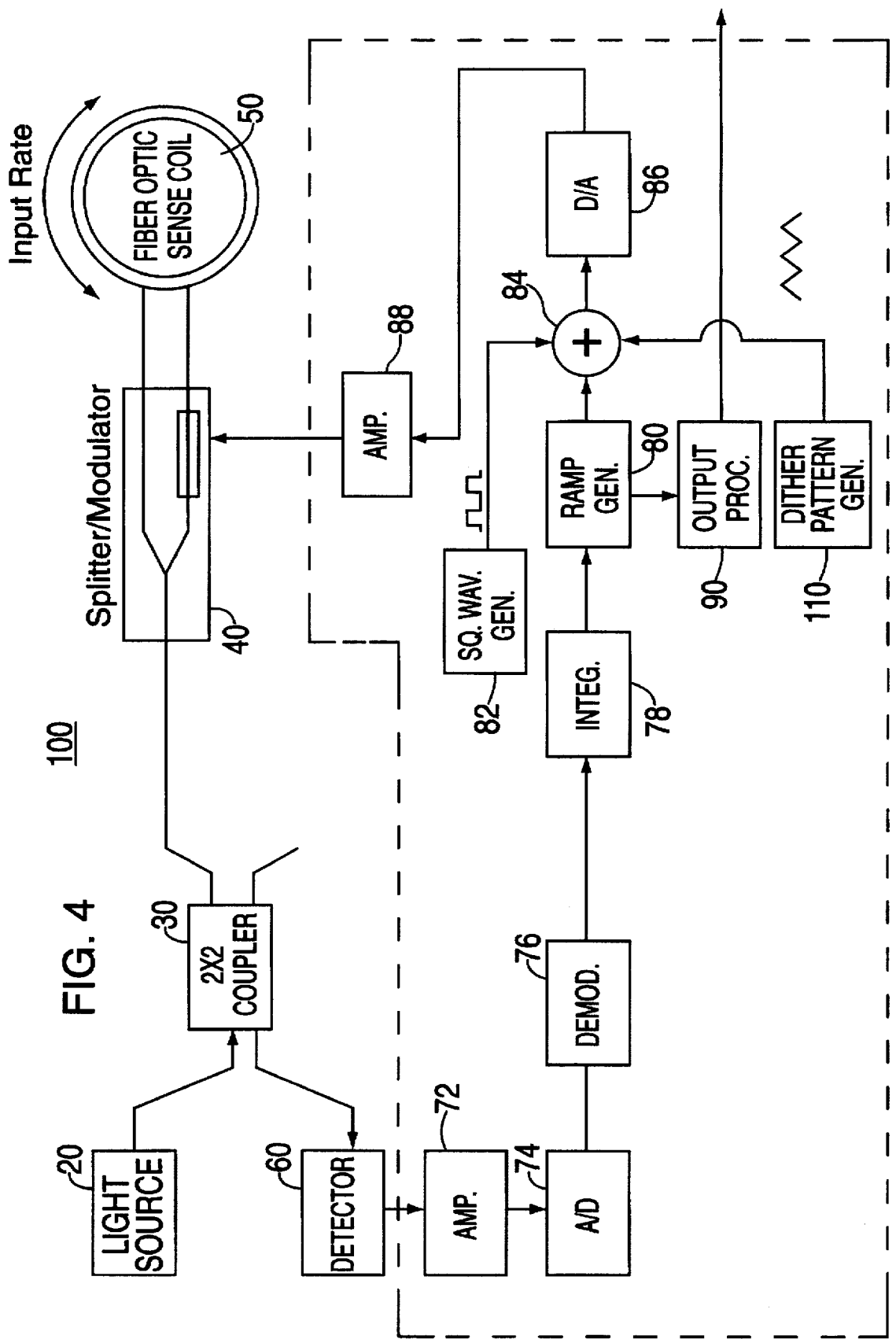
FIG. 4 is a schematic block diagram of the gyroscope of FIG. 1 with dithering.

At high angular rates, the system performs reasonably well. However, at low angular rates the resultant error signals are of a relatively low amplitude, leading to significant non-linearities or a deadzone caused by imperfections in the system's optical and electrical components. To counteract these effects, a periodic dither signal is introduced to ensure that all error sources are continually exercised even when the angular rate is at or near zero. As illustrated in FIG. 4, the dither signal is generated by a dither pattern generator 110 and introduced at the summing means 84.

The performance of the gyroscope system 100 is transparent to the additional input of the dither signal. First, the average value of the dither signal is zero over one cycle of dither. Second, the feedback of the closed-loop drives the modulation to zero and therefore the signal processor will merely compensate for the additional input.

A triangular waveform or a digital stair-step ramp approximating a triangular waveform are two preferred waveforms for the dither signal, although other symmetrical waveforms may be employed, as will readily occur to one skilled in the art. The size of the individual steps are selected such that the frequency of the resulting dither signal is greater than the closed-loop bandwidth of the gyroscope system 100. A suitable frequency for the dither signal is 250 Hz, which is five times the nominal closed-loop bandwidth (i.e., 50 Hz) of the specific gyroscope utilized.

Figure 5:
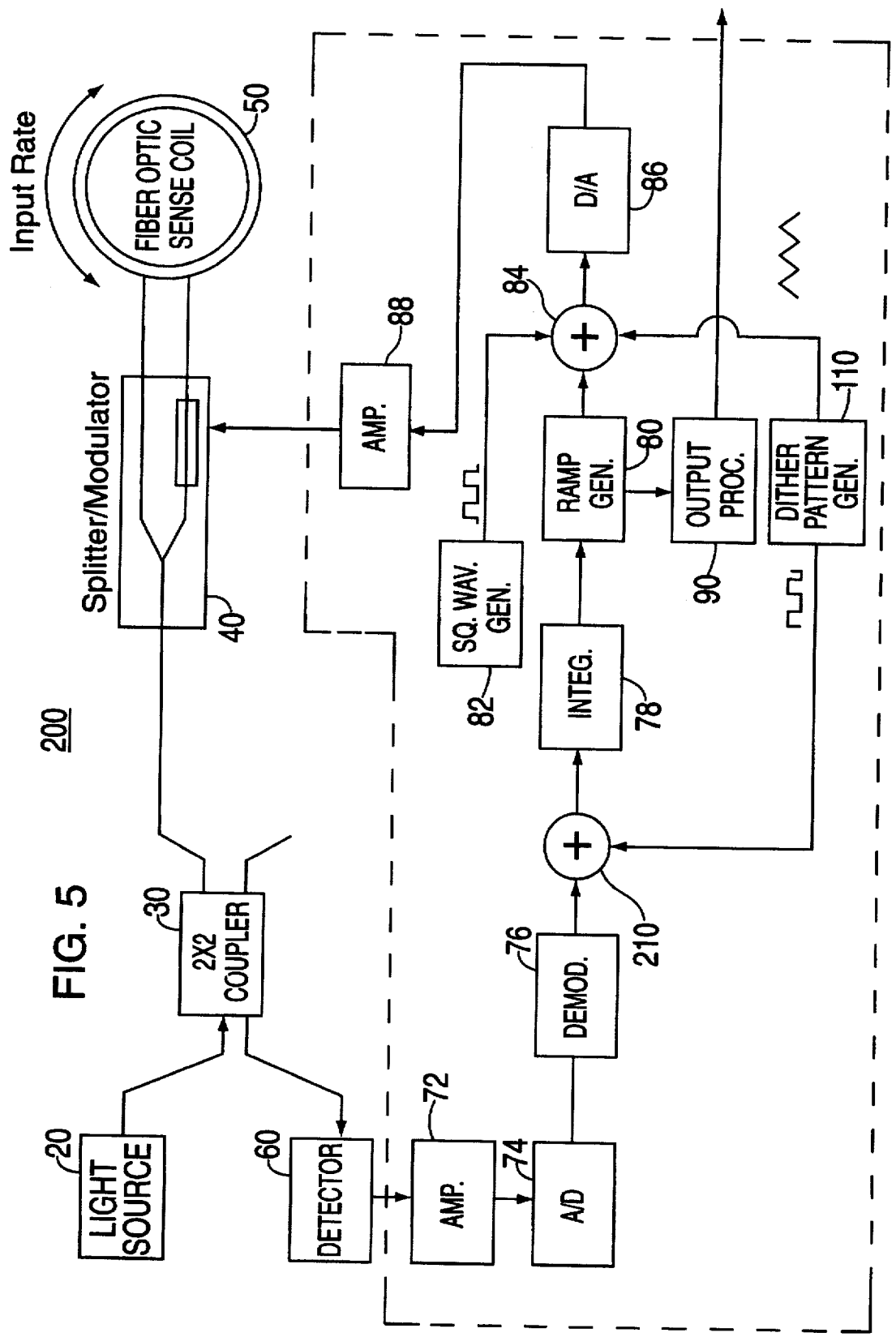
FIG. 5 is a schematic block diagram of the gyroscope of FIG. 4 with compensation.

The dither signal may not completely eliminate the deadzone. Because the gyroscope closed-loop gain is not zero at the frequency of the dither signal, the system responds to the dither signal as if it was a rate input, resulting in a component in the detector output that allows a small, but reduced, deadzone to remain. A further improvement can be achieved by introducing a compensation signal to the output of the demodulator 76, as shown in FIG. 5, to compensate for these errors.

The compensation signal is generated by the dither pattern generator 110 and combined with the demodulated signal at a second summing means 210. The compensation signal is a square wave having the same frequency and phase as the dither signal. The amplitude of the compensation signal is adjusted to cancel the influence of the dither signal on the gyroscope closed-loop response. The combined signal now passes to the integrator 78 and ultimately reaches the splitter/modulator 40.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A system, comprising:
    a fiber optic gyroscope for sensing angular rate comprising
        light source for generating a light output;
        a splitter/modulator for splitting the light output into two beams, modulating one of the beams, and recombining the two beams;
        a fiber optic sense coil for directing one of the beams in a clockwise direction through the fiber optic sense coil and the other of the beams in a counterclockwise direction through the fiber optic sense coil; and
        a detector for detecting the recombined beams and providing an output proportional to the magnitude of the recombined beams; and
    a processor for generating a feedback signal in response to the output of the detector and providing the feedback signal to splitter/modulator, comprising
        ramp generator means, responsive to the output, for generating a feedback signal proportional to the phase difference between the clockwise and the counterclockwise beams, where the feedback signal assumes a steady-state operating point for any given angular rate;
        a biasing function generator for shifting the steady-state operating point; and
        a dither pattern generator for generating a waveform for continuously oscillating the feedback signal about the instantaneous value of the operating point.

2. A system as set forth in claim 1, where the dither pattern generator includes means for generating a symmetrical waveform.

3. A system as set forth in claim 1, where the dither pattern generator includes means for generating a triangular waveform or a digital stair-step ramp approximating a triangular waveform.

4. A system as set forth in claim 1, further including means for adding a compensation signal to the output of the detector to remove the component of the output introduced by the dither pattern generator.

5. A system as set forth in claim 4, where the compensation signal is a square wave having the same frequency and phase as the output of the dither pattern generator.

6. A signal processor for generating a feedback signal in response to the output of a rate-sensing fiber optic gyroscope comprising a light source for generating a light output; a splitter/modulator for splitting the light output into two beams, modulating the beams in response to the feedback signal, and recombining the two beams; a fiber optic sense coil for directing one of the beams from the splitter/modulator in a clockwise direction through the fiber optic sense coil and the other of the beams in a counterclockwise direction through the fiber optic sense coil; and a detector for detecting the recombined beams and providing an output proportional to the magnitude of the recombined beams; the signal processor comprising:

ramp generator means, responsive to the output, for generating an feedback signal proportional to the phase difference between the clockwise and the counterclockwise beams, where the feedback signal assumes a steady-state operating point for any given angular rate;

a biasing function generator for shifting the steady-state operating point; and a dither pattern generator for generating a waveform for continuously oscillating the feedback signal about the instantaneous value of the operating point.

7. A system as set forth in claim 6, where the dither pattern generator includes means for generating a symmetrical waveform.

8. A system as set forth in claim 6, where the dither pattern generator includes means for generating a triangular waveform or a digital stair-step ramp approximating a triangular waveform.

9. A system as set forth in claim 6, further including means for adding a compensation signal to the output of the detector to remove the component of the output introduced by the dither pattern generator.

10. A system as set forth in claim 9, where the further the compensation signal is a square wave having the same frequency and phase as the output of the dither pattern generator.

11. A method of sensing angular rate in a fiber optic gyroscope comprising a fiber optic sense coil, comprising the steps of:

generating a light output;

splitting the light output into two beams;

directing one of the beams in a clockwise direction through the fiber optic sense coil and the other of the beams in a counterclockwise direction through the fiber optic sense coil;

recombining the two beams;

detecting the recombined beams and providing an output proportional to the magnitude of the recombined beams; and in response to the output, generating a feedback signal and modulating the light beams in response to the feedback signal, the step of generating a feedback signal including the steps of:

generating a feedback signal proportional to the phase difference between the clockwise and the counterclockwise beams, where the feedback signal assumes a steady-state operating point for any given angular rate;

shifting the steady-state operating point; and continuously oscillating the feedback signal about the instantaneous value of the operating point.

12. A method as set forth in claim 11, where step of continuously oscillating the feedback signal about the instantaneous value of the operating point includes the step of generating a symmetrical waveform.

13. A method as set forth in claim 11, where step of continuously oscillating the feedback signal about the instantaneous value of the operating point includes the step of generating a triangular waveform or a digital stair-step ramp approximating a triangular waveform.

14. A method as set forth in claim 11, further including the step of adding a compensation signal to the output to remove the component of the output introduced by the step of continuously oscillating the feedback signal about the instantaneous value of the operating point.

15. A system as set forth in claim 14, where the compensation signal is a square wave having the same frequency and phase as the dither signal.

* * * * *